US011440233B1

(12) United States Patent
Schirmer et al.

(10) Patent No.: US 11,440,233 B1
(45) Date of Patent: *Sep. 13, 2022

(54) BLOWN FILM COEXTRUSION LINE WITH POLYGONAL EXTRUDER ARRANGEMENT

(71) Applicant: BBS Corporation, Spartanburg, SC (US)

(72) Inventors: Henry G. Schirmer, Spartanburg, SC (US); Roger Blaine Trivette, Boiling Springs, SC (US); Matthew G. Hampshire, Chesnee, SC (US)

(73) Assignee: BBS Corporation, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,888

(22) Filed: Feb. 16, 2022

Related U.S. Application Data

(63) Continuation of application No. 17/403,039, filed on Aug. 16, 2021, now Pat. No. 11,338,490, and a
(Continued)

(51) Int. Cl.
*B29C 48/10* (2019.01)
*B29C 48/21* (2019.01)
(Continued)

(52) U.S. Cl.
CPC ............ *B29C 48/10* (2019.02); *B29C 48/185* (2019.02); *B29C 48/21* (2019.02); *B29C 48/266* (2019.02);
(Continued)

(58) Field of Classification Search
CPC ..... B29C 48/0018; B29C 48/10; B29C 48/18; B29C 48/185; B29C 48/21; B29C 48/34;
(Continued)

(56) References Cited

U.S. PATENT DOCUMENTS

| | | | |
|---|---|---|---|
| 2,820,249 | A | 1/1958 | Colombo |
| 2,844,846 | A | 7/1958 | Kronholm |

(Continued)

FOREIGN PATENT DOCUMENTS

| | | |
|---|---|---|
| DE | 19927556 | 12/2000 |
| EP | 0471879 | 2/1992 |

(Continued)

OTHER PUBLICATIONS

Schirmer et al., "Nano-Layer Structural Advancesin Shrink Films," SPE Polyolefins Conference, Houston, Texas, Feb. 2013, 13 pages.

(Continued)

*Primary Examiner* — Xiao S Zhao
*Assistant Examiner* — Joseph S Leyson
(74) *Attorney, Agent, or Firm* — Maxwell J. Petersen; FisherBroyles, LLP

(57) ABSTRACT

A blown film coextrusion line includes a support frame, a plurality of extruders each mounted to the support frame and extending upward at an angle, and a downward facing blown film coextrusion die connected to distal ends of each of the plurality of extruders and receiving individual polymer streams from them. The blown film coextrusion line is compact and sturdy and eliminates much of the floor space and towered mounting structure that was required for conventional blown film coextrusion lines. A corresponding method of making a multilayer coextruded blown film is also provided.

21 Claims, 7 Drawing Sheets

66 68 66 64 64 62 72 70 62 10 58 74 58 56 56 50a 50b 46 76 54 54 52 52 14 16 78 12 82 80

Related U.S. Application Data continuation-in-part of application No. 17/226,921, filed on Apr. 9, 2021, now Pat. No. 11,173,642.

(51) Int. Cl.

| | |
|---|---|
| ***B29C 48/49*** | (2019.01) |
| ***B29C 48/34*** | (2019.01) |
| ***B29C 49/04*** | (2006.01) |
| ***B29C 48/18*** | (2019.01) |
| ***B29C 48/25*** | (2019.01) |
| *B29L 31/00* | (2006.01) |
| *B29L 7/00* | (2006.01) |

(52) U.S. Cl.

CPC .............. *B29C 48/34* (2019.02); *B29C 48/49* (2019.02); *B29C 49/04* (2013.01); *B29L 2007/00* (2013.01); *B29L 2031/7562* (2013.01)

(58) Field of Classification Search

CPC ..... B29C 48/265; B29C 48/266; B29C 48/28; B29C 48/49

See application file for complete search history.

(56) References Cited

U.S. PATENT DOCUMENTS

| | | | | |
|---|---|---|---|---|
| 3,215,406 A * | 11/1965 | Perry | .................... B29C 48/475 425/327 |
| 3,215,416 A | 11/1965 | Perry et al. | |
| 3,308,508 A | 3/1967 | Schrenk | |
| 3,321,803 A | 5/1967 | Corbett | |
| 3,565,985 A | 2/1971 | Schrenk et al. | |
| 3,756,758 A | 9/1973 | Prall | |
| 3,759,647 A | 9/1973 | Schrenk et al. | |
| 3,924,990 A | 12/1975 | Schrenk | |
| 3,980,744 A | 9/1976 | Cogswell | |
| 4,125,585 A | 11/1978 | Rosenbaum | |
| 4,167,383 A | 9/1979 | Murakami et al. | |
| 4,208,175 A | 6/1980 | Rosenbaum | |
| 4,249,875 A | 2/1981 | Hart et al. | |
| 4,669,965 A | 6/1987 | Murakami | |
| 4,715,803 A | 12/1987 | Koppa | |
| 4,772,195 A | 9/1988 | Touchet | |
| 4,798,526 A | 1/1989 | Briggs et al. | |
| 4,832,589 A | 5/1989 | Gini et al. | |
| 4,889,477 A | 12/1989 | Wortberg et al. | |
| 5,035,596 A | 7/1991 | Pohl | |
| 5,076,776 A | 12/1991 | Yamada et al. | |
| 5,103,337 A | 4/1992 | Schrenk et al. | |
| 5,110,530 A | 5/1992 | Havens | |
| 5,292,472 A | 3/1994 | Tompkins | |
| 5,516,472 A | 5/1996 | Laver | |
| 5,518,036 A | 5/1996 | DeMasters et al. | |
| 5,538,411 A | 7/1996 | Gates | |
| 5,690,972 A | 11/1997 | Planeta et al. | |
| 5,723,157 A | 3/1998 | Grutjen | |
| 5,762,971 A | 6/1998 | Schirmer | |
| 5,891,480 A | 4/1999 | Schmidt | |
| 6,000,926 A | 12/1999 | Schirmer | |
| 6,082,025 A | 7/2000 | Bonk | |
| 6,383,589 B1 | 5/2002 | Akutagawa | |
| 6,413,595 B1 | 7/2002 | Schirmer | |
| 8,241,736 B2 | 8/2012 | Ramli et al. | |
| 8,870,561 B2 | 10/2014 | Schirmer | |
| 9,381,723 B2 | 7/2016 | Kumar et al. | |
| 10,611,129 B2 | 4/2020 | Schirmer | |
| 2001/0000234 A1 | 4/2001 | Helms, Jr. et al. | |
| 2001/0015513 A1 | 8/2001 | Schaftingen | |
| 2005/0271761 A1 | 12/2005 | Ohki | |
| 2007/0243276 A1 | 10/2007 | Carniero | |
| 2008/0274349 A1 | 11/2008 | Giammatteo | |
| 2009/0087654 A1 | 4/2009 | Ling | |
| 2010/0072655 A1 | 3/2010 | Roberts et al. | |
| 2010/0215879 A1 | 8/2010 | Dooley | |
| 2010/0227136 A1 | 9/2010 | Ramli | |
| 2011/0227922 A1 | 9/2011 | Rivett | |
| 2011/0264057 A1 | 10/2011 | Eversull | |
| 2013/0009336 A1 | 1/2013 | Ausen et al. | |
| 2013/0243894 A1 | 9/2013 | Schirmer | |
| 2014/0363600 A1 | 12/2014 | Dooley | |
| 2018/0029338 A1 | 2/2018 | Schirmer | |
| 2020/0391425 A1 | 12/2020 | Schirmer | |
| 2020/0391427 A1 | 12/2020 | Schirmer | |

FOREIGN PATENT DOCUMENTS

| | | |
|---|---|---|
| EP | 0626247 | 11/1994 |
| EP | 1604802 A2 | 12/2005 |
| EP | 1604802 A3 | 10/2012 |
| FR | 2625941 | 7/1989 |
| GB | 2161745 | 1/1986 |
| WO | 0076765 | 12/2000 |
| WO | 2011119323 | 9/2011 |
| WO | 2016086314 | 6/2016 |
| WO | 2017083633 | 5/2017 |

OTHER PUBLICATIONS

Schrenk et al., "Coextruding Multilayer Blown Film—Part 1," SPE Journal, vol. 29 pp. 38-42, Jun. 1973.
Schrenk et al., "Coextruding Multilayer Blown Film—Part 2," SPE Journal, vol. 29 pp. 43-47, Jul. 1973.
European Search Report for EP 22153498.5, dated Jul. 1, 2022.

* cited by examiner

BLOWN FILM COEXTRUSION LINE WITH POLYGONAL EXTRUDER ARRANGEMENT

RELATED APPLICATIONS

This application is a continuation of U.S. application Ser. No. 17/403,039, filed on Aug. 16, 2021, which in turn is a continuation-in-part of U.S. application Ser. No. 17/226,921, filed on Apr. 9, 2021, issued as U.S. Pat. No. 11,173,642, the disclosures of which are incorporated herein by reference.

FIELD OF THE INVENTION

This present invention is directed to a blown film coextrusion line having an advantageous extruder and die arrangement that provides a sturdy structure and enables a cost saving, compact fit into smaller spaces for transport and use. The invention also includes a corresponding method of making a multilayer coextruded blown film.

BACKGROUND OF THE INVENTION

Conventional blown film coextrusion lines typically utilize from two to four extruders (sometimes more) that are horizontally disposed and feed into an upward or downward facing blown film coextrusion die and bubble. The conventional lines require substantial space and a support structure, sometimes called a "tower," that contains and stabilizes the coextrusion die, blown film bubble and collapsing nip rollers. For an upward facing blown film line, the extruders are commonly located at or slightly above operator standing level and the blown film bubble travels to collapsing nip rollers that are significantly higher than operator standing level. For a downward facing blown film line, the collapsing nip rollers are closer to operator standing level, however the extruders are significantly higher than operator standing level. The support structure must then be large enough and sturdy enough to maintain and stabilize the extruders at an elevated height.

Improvements in blown film coextrusion technology have resulted in more compact coextrusion die structures that significantly shortened the height required for the blown film coextrusion die while substantially increasing the number of layers (while reducing the thickness of individual layers) in the coextruded blown film structure. Modular disk coextrusion dies are known for providing multilayer blown films having high numbers of layers. U.S. Pat. Nos. 5,762,971 and 6,000,926, both issued to Schirmer, disclose an original modular disk coextrusion die that includes a plurality of cells of thin annular disks stacked on top of each other. Each cell includes, in sequence, an end cap disk, a distribution disk, an internal cap disk and a spreader disk (referred to as a spacer disk in the patents). In FIG. 4 of each patent, seven cells are stacked on top of each other and another end cap disk is added to enable production of a seven-layer blown film using melt streams that are individually processed into film layers in each of the cells. The disks and cells are bolted together to make a single seven-layer die. Each of the cells produces one layer of the multilayer film.

U.S. Publication 2020/0391425 (issued as U.S. Pat. No. 11,090,853) and U.S. Publication 2020/0391427 (issued as U.S. Pat. No. 11,220,035), both to Schirmer, disclose an improved modular disk coextrusion die having an opposing disk arrangement that enables the production of nanolayer films having up to 300 or more layers, using symmetrically arranged cells of thin annular disks that produce two film layers per cell, with each cell being fed at opposing inlet locations that are 180 degrees apart from each other. The drawings of each publication illustrate 24-layer nanolayer structures formed using twelve of the cells stacked on top of each other and four extruders, each feeding a different polymer composition. Each cell has two opposed entry points and the twelve-cell die uses twelve polymer entry points to produce 24 nanolayers.

While modular disk coextrusion dies require significantly less vertical height than conventional blown film coextrusion dies, the extruders have required significant floor space or elevated space and a relatively complex support structure such as a tower is still needed for the overall blown film line. There is a need or desire for a blown film coextrusion line, especially a nanolayer blown film coextrusion line, and a corresponding method, that can produce complex film structures having large numbers of layers while requiring less space and a more efficient support structure.

SUMMARY OF THE INVENTION

The present invention is directed to a blown film coextrusion line that includes a support frame, a plurality of extruders each mounted to the support frame and extending upward at an angle, and a downward facing blown film coextrusion die connected to distal ends of each of the plurality of extruders and receiving individual polymer streams from them. The angular arrangement of extruders may resemble a triangle, trapezoid, pyramid or other polygonal or polyhedral shape because the plurality of extruders generally tilt inward, toward each other and toward the blown film coextrusion die. The resulting blown film coextrusion line is compact, sturdy, and eliminates much of the floor space and towered mounting structure that was required for conventional blown film coextrusion lines.

In one embodiment, the support frame can include at least four upright support elements, a plurality of lateral support elements each joined to at least two of the upright support elements, and at least one longitudinal support element extending between at least two of the lateral support elements. At least a first extruder can be supported by a first of the lateral support elements and can extend upward from the first lateral support element at a first angle. At least a second extruder can be supported by a second of the lateral support elements and can extend upward from the second lateral support element at a second angle. The first and second angles oppose each other, meaning that the first and second extruders are tilted toward each other so that the distal end of each extruder is in fluid communication with an inlet to the downward facing blown film coextrusion die. The first and second angles can be about 20 to about 70 degrees relative to horizontal, or about 30 to about 60 degrees relative to horizontal, or about 35 to about 55 degrees relative to horizontal, or about 40 to about 50 degrees relative to horizontal, or about 45 degrees relative to horizontal.

In some embodiments, third, fourth, fifth, sixth, seventh, eighth, ninth, tenth, eleventh and/or twelfth extruders can be mounted to the support frame at the same, similar or different angles pointing upward and inward so that the distal end of each and every extruder is in fluid communication with and suitably connected to a corresponding inlet in the downward facing blown film coextrusion die. In one embodiment, elements of the mounting frame can include a movable platform to which the extruders are mounted, and a mechanism for raising and lowering the movable platform. When the movable platform is raised or lowered, all of the extruders and the downward facing blown film coextrusion die are raised or lowered in tandem so as to lengthen or shorten the downward traveling blown film bubble that is being extruded from the die. In one embodiment, the blown film coextrusion line includes bubble collapsing nip rollers and, suitably, a winding assembly at or near the base of the mounting frame.

With the foregoing in mind, one embodiment of the blown film coextrusion line can include:

- a support frame including at least four upright support elements, a plurality of lateral support elements each joined to at least two of the upright support elements, and at least one longitudinal support element extending between at least two of the lateral support elements;
- at least a first extruder supported by a first of the lateral support elements and extending upward from the first of the lateral support elements at a first angle;
- at least a second extruder supported by a second of the lateral support elements and extending upward from the second of the lateral support elements at a second angle; and
- a downward facing blown film coextrusion die in fluid communication with a first distal end of the first extruder and a second distal end of the second extruder;
- wherein the first angle is from about 20 to about 70 degrees relative to horizontal, the second angle is about 20 to about 70 degrees relative to horizontal, and the first and second angles oppose each other.

Another embodiment of the blown film coextrusion line can include:

- a support frame including at least four upright support elements, a plurality of lateral support elements each joined to at least two of the upright support elements, and at least one longitudinal support element extending between at least two of the lateral support elements;
- at least four extruders mounted to the plurality of lateral support elements, wherein at least a first and a third of the four extruders extend upward from a first of the lateral support elements at first and third angles, respectively, and at least a second and a fourth of the four extruders extend upward from a second of the lateral support elements at second and fourth angles, respectively; and
- a downward facing blown film coextrusion die in fluid communication with a first distal end of the first extruder, a second distal end of the second extruder, a third distal end of the third extruder and a fourth distal end of the fourth extruder;
- wherein each of the first and third angles is from about 30 to about 60 degrees relative to horizontal, each of the second and fourth angles is about 30 to about 60 degrees relative to horizontal, and the second and fourth angles oppose the first and third angles.

Still another embodiment of the blown film coextrusion line can include:

- a support frame;
- at least a first extruder mounted to the support frame and extending upward from the support frame at a first angle;
- at least a second extruder mounted to the support frame and extending upward from the support frame at a second angle; and
- a downward facing blown film coextrusion die in fluid communication with a first distal end of the first extruder and a second distal end of the second extruder;
- wherein the first angle is from about 30 to about 60 degrees relative to horizontal, the second angle is about 30 to about 60 degrees relative to horizontal, and the first and second angles oppose each other.

The present invention is also directed to a method of making a multilayer coextruded blown film. In one embodiment, the method can include the steps of:

- extruding a first polymer stream upward at a first angle toward a blown film coextrusion die using a first extruder;
- extruding a second polymer stream upward at a second angle toward the blown film coextrusion die using a second extruder; and
- extruding a third polymer stream upward at a third angle toward the blown film coextrusion die using a third extruder;
- feeding the first, second and third polymer streams into the blown film coextrusion die; and
- coextruding the first, second and third polymer streams using the blown film coextrusion die as a downward facing bubble to make the multilayer coextruded blown film.

In another embodiment, the method can include the steps of:

- extruding a first polymer stream upward at a first angle toward a blown film coextrusion die using a first extruder;
- extruding a second polymer stream upward at a second angle toward the blown film coextrusion die using a second extruder; and
- extruding a third polymer stream upward at a third angle toward the blown film coextrusion die using a third extruder;
- extruding a fourth polymer stream upward at a fourth angle toward the blown film coextrusion die using a fourth extruder
- feeding the first, second, third and fourth polymer streams into the blown film coextrusion die; and
- coextruding the first, second, third and fourth polymer streams using the blown film coextrusion die as a downward facing bubble to make the multilayer coextruded blown film;
- wherein the first, second, third and fourth angles are each about 30 to about 60 degrees from horizontal.

In another embodiment, the method can include the steps of:

- extruding a first polymer stream upward at a first angle toward a blown film coextrusion die using a first extruder that is connected to an inlet of the blown film coextrusion die;
- extruding a second polymer stream upward at a second angle toward the blown film coextrusion die using a second extruder that is connected to an inlet of the blown film coextrusion die;
- extruding a third polymer stream upward at a third angle toward the blown film coextrusion die using a third extruder that is connected to an inlet of the blown film coextrusion die;
- feeding the first, second and third polymer streams into the blown film coextrusion die; and
- coextruding the first, second and third polymer streams using the blown film coextrusion die as a downward facing bubble to make the multilayer coextruded blown film.

The foregoing and other features and advantages will become further apparent from the following detailed description, read in conjunction with the accompanying drawings.

DETAILED DESCRIPTION OF THE INVENTION

Figure 1:
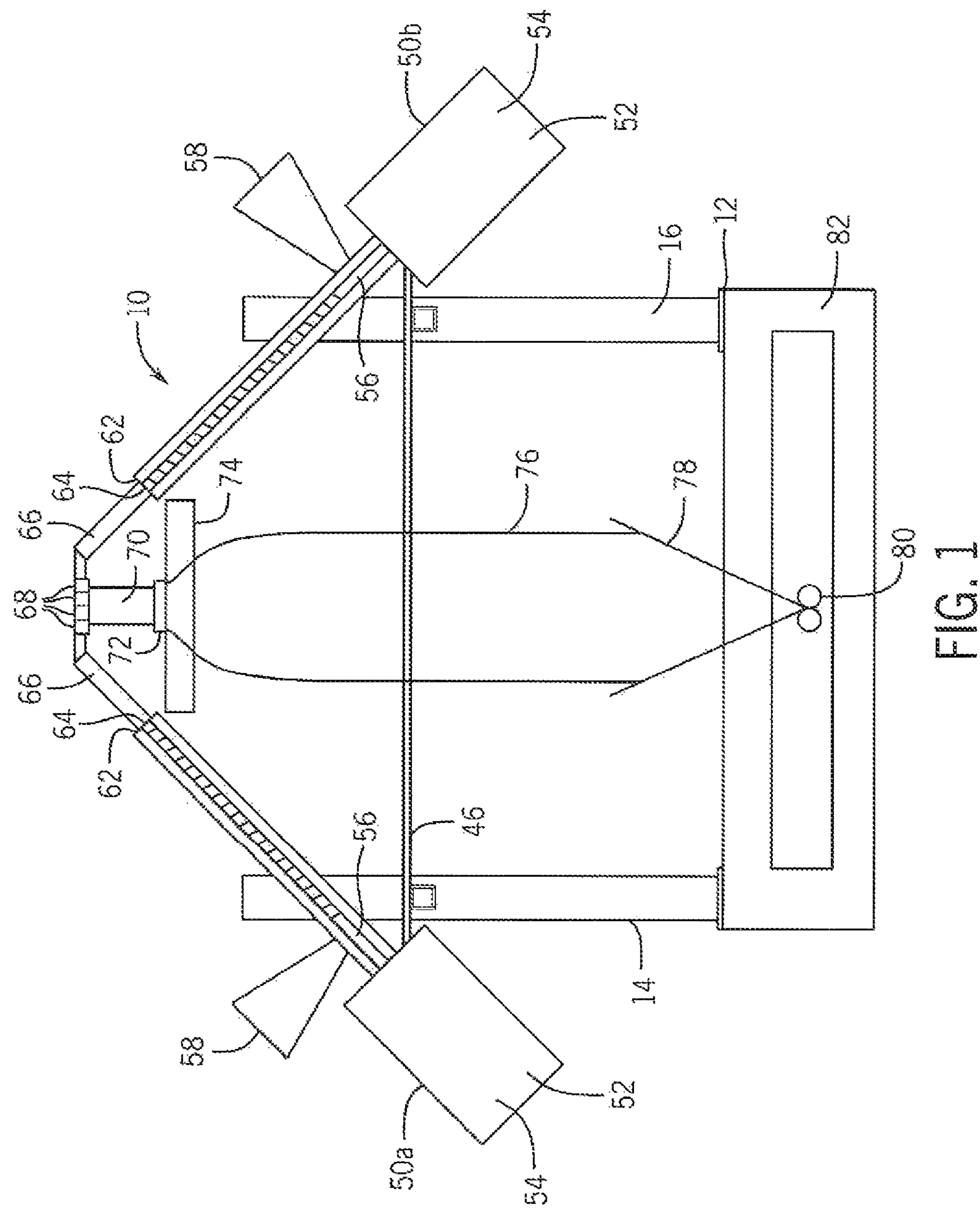
FIG. 1 schematically illustrates a front view one embodiment of the blown film coextrusion line.
Figure 2:
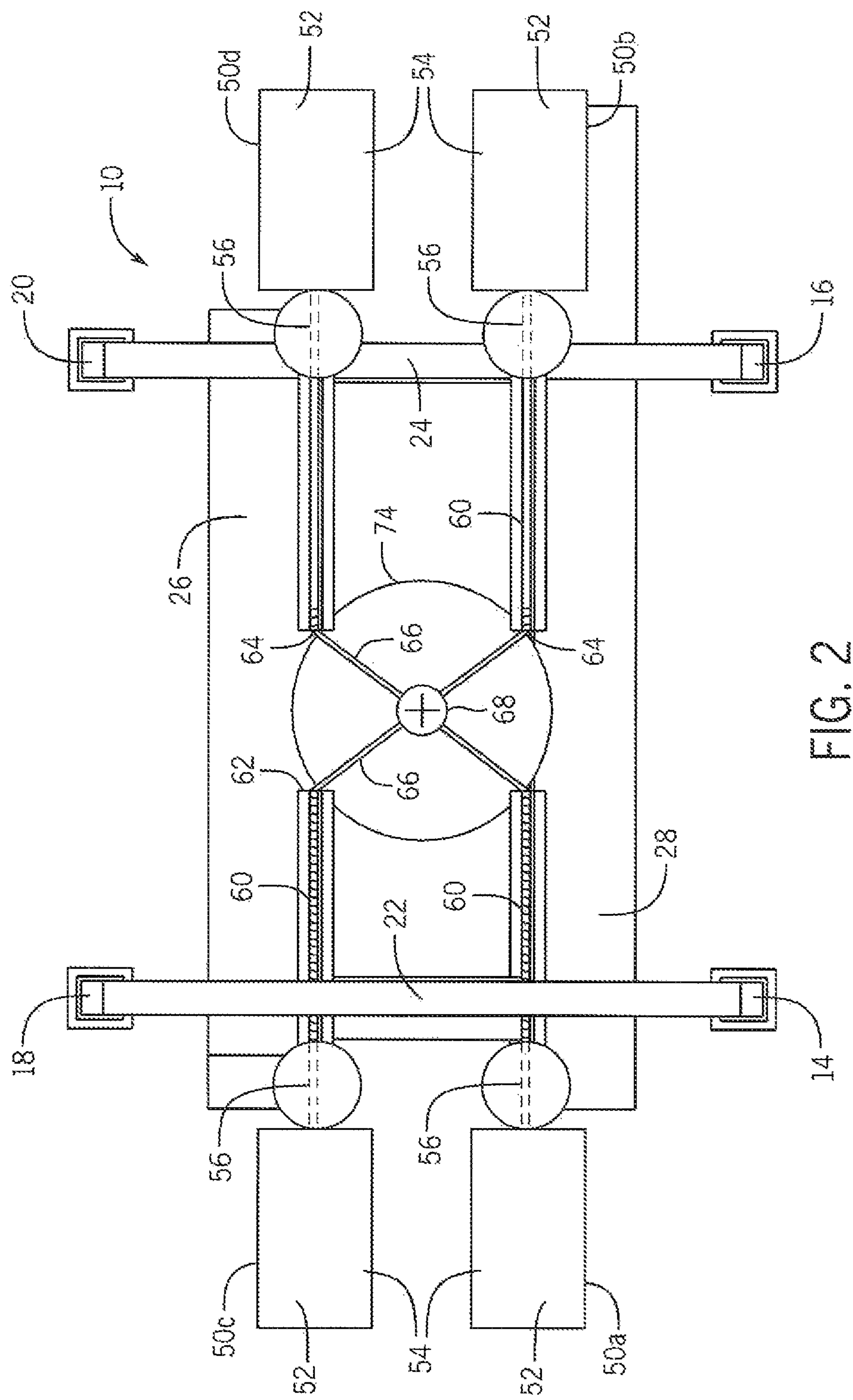
FIG. 2 schematically illustrates a top view of the blown film coextrusion line of FIG. 1.
Figure 3:
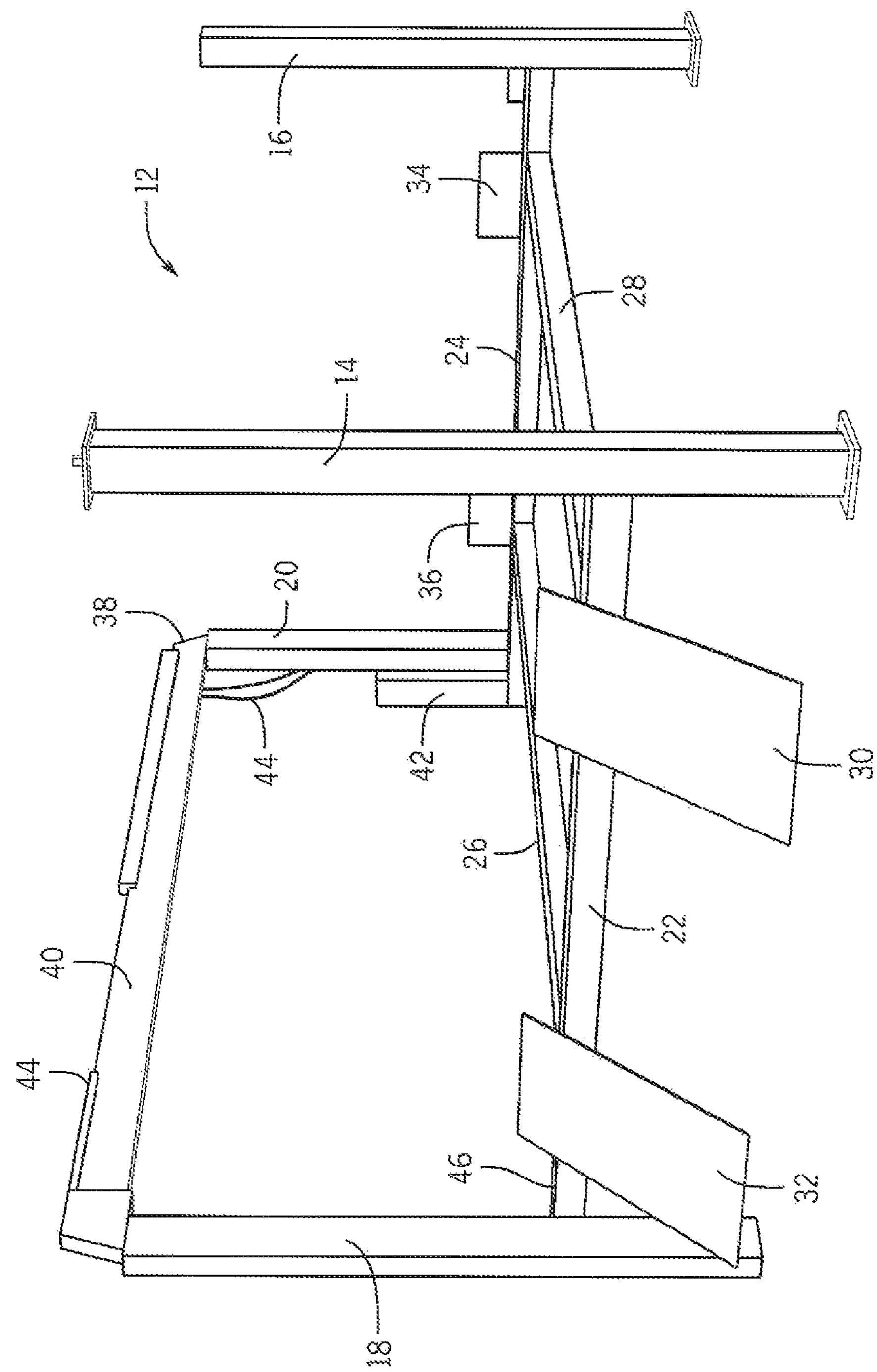
FIG. 3 is a perspective view of one embodiment of a mounting frame useful in the blown film coextrusion line.

Referring to FIGS. 1-3, an exemplary blown film coextrusion line 10 includes a support frame 12 (whose details are shown in FIG. 3) that includes at least four upright support elements 14, 16, 18 and 20, a plurality of lateral support elements 22 and 24, and one or more longitudinal support elements 26 and 28. Each of the lateral support elements is joined to at least two of the upright support elements. As shown, a first lateral support element 22 is joined to upright support elements 14 and 18. A second lateral support element 24 is joined to upright support elements 16 and 20. Each of the longitudinal support elements extends between and is joined to at least two of the lateral support elements. As shown, longitudinal support elements 26 and 28 extend between and are joined to the first and second lateral support elements 22 and 24. The support frame 12 can also include a plurality of mounting pads 30, 32, 34 and 36 which can be connected to the first and second lateral support elements 22 and 24, and can be pivotally connected to the lateral support elements to enable posturing at different angles.

The support frame 12 can also include one or more elevation mechanisms 38, each of which can include an overhead mounting bar 40 extending between and connected to two of the upright support elements, e.g., 18 and 20, motor driven pulley 42 connected to at least one of the lateral and/or longitudinal support elements, e.g., lateral support element 24, and one or more cables 44 connected to two or more of the lateral and/or longitudinal support elements. In the support frame 12 shown in FIG. 3, the lateral and longitudinal support elements 22, 24, 26 and 28 define a movable platform 46 that can be moved vertically relative to the upright support elements 14, 16, 18 and 20. Because these elements are interconnected, the motor driven pulley 42 manipulates the cables 44 to vertically elevate or lower the entire platform 46, as well as the extruders and blown film die that are supported by the platform 46 as described below. The structural elements of the support frame 12 are suitably constructed of heavy duty steel, for example, heavy duty stainless steel, so that the support frame 12 is capable of withstanding loads of five to ten tons or more depending on the size and capacity of the blown film coextrusion line 10. One example of a suitable support frame is a Tuxedo® 12,000-lb. Four Post Lift-Cable Driven, sold by SEGA Equipment, LLC.

In the embodiment of FIGS. 1-2, four extruders 50*a*, 50*b*, 50*c* and 50*d* (collectively "50") are securely mounted to the support frame 12, suitably via mounting pads 30, 32, 34 and 36, which in turn are connected to the first and second lateral support elements 22 and 24 of the support frame 12. Each of the extruders can include a drive motor 52 at its proximal end 54, which can be a torque drive motor. Advantages of using torque drive motors include lighter weight because no gear box is required, and sufficient power to push the polymer feed uphill at an angle through the extruders. Each of the extruders can also include a feed section 56 into which polymer is fed through a hopper 58, an extrusion section 60, and a distal end 62 defining an exit 64. Each distal end 62 can be connected to a feed line 66 that is in turn connected to and feeds a respective individual inlet 68 of a downward facing blown film coextrusion die 70. In one embodiment, the blown film coextrusion die 70 can have as many as twelve separate inlets 68 arranged around the circumference of a thin annular feeding disk as described in the above-identified U.S. Publication 2020/0391425 and U.S. Publication 2020/0391427, incorporated herein by reference, and each of the polymer inlets 68 can ultimately produce several nanolayer film layers having the respective polymer composition.

The four extruders 50*a*, 50*b*, 50*c* and 50*d* can be positioned at acute angles relative to horizontal. In the illustrated embodiment, the first extruder 50*a* is positioned at a first angle and the second extruder 50*b* is positioned at a second angle, with the first end second angles opposing each other. The third extruder 50*c* is positioned at a third angle which can also opposes the second angle. The fourth extruder 50*d* is positioned at a fourth angle that opposes the third angle and can also oppose the first angle. The phrases "opposing angles" and "angles that oppose each other" mean that the subject extruders are tilted toward each other, for example in a triangular or trapezoidal configuration. The first, second, third and fourth angles can each be about 20 to about 70 degrees from horizontal, or about 30 to about 60 degrees from horizontal, or about 35 to about 55 degrees from horizontal, or about 40 to about 50 degrees from horizontal, or about 45 degrees from horizontal as shown. The opposing first and third angles can be of the same magnitude, but in some cases may have different magnitudes. The opposing second and fourth angles may be of the same magnitude, but in some cases may have different magnitudes. In alternative embodiments further described below, the blown film coextrusion line 10 can include fifth, sixth, seventh, eighth, ninth, tenth, eleventh and/or twelfth extruders that can be mounted on opposite sides of the support frame 12 in similar opposing fashion as the extruders 50*a*, 50*b*, 50*c* and 50*d* at angles within the ranges described above, with the extruders on the opposite sides being mounted at angles that oppose each other. This enables the distal end 62 of each extruder to feed polymer into the blown film coextrusion die 70 while the proximal end 54 of each extruder can be positioned on or below the opposing first and second lateral support elements 22 and 24 of the support frame 12.

In addition to an annular disk arrangement such as described in the foregoing U.S. Publication 2020/0391425 and U.S. Publication 2020/0391427, the blown film coextrusion die 70 includes an end plate 72 resting above an air ring 74 which is sized so that it can be connected to and supported by engaging portions of the extruders 50*a*, 50*b*, 50*c* and 50*d*. The blown film coextrusion die 70 is also supported by the hanging connections provided by the feed lines 66 extending from the four extruders. By surrounding and sandwiching the blown film coextrusion die 70 between the extruders 50*a*, 50*b*, 50*c* and 50*d*, the feed lines 66 and the appropriately sized air ring 74, the blown film coextrusion die 70 can be maintained in a stable position during operation without requiring the use of a tower as used in conventional blown film coextrusion lines. The blown film coextrusion die 70 thus produces a stable bubble 76 that can be ultimately collapsed upon entering collapsing frame 78, passed between nip rollers 80 located at or near the base 82 of support frame 12, and wound and stored as a flat film.

The downward facing blown film coextrusion die 70 can have a variety of die configurations provided they are sufficiently compact to fit within the limited available space. Suitable die configurations include without limitation known modular disk coextrusion die configurations, including without limitation modular disk coextrusion dies with opposing disk arrangements described in U.S. Publication 2020/0391425 and U.S. Publication 2020/0391427, both issued to Schirmer, the disclosures of which are incorporated herein by reference. These and other modular disk coextrusion die employ suitable arrangements of thin annular disks to produce a variety of complex and more simple blown film structures, including nanolayer blown film structures having unique barrier properties and other physical characteristics. The foregoing modular disk coextrusion dies can comfortably accommodate up to twelve polymer entry points that can be used to form repeating and/or alternating layer arrangements having up to twelve different polymer compositions. By extruding the bubble 76 downward, it is possible to add a liquid through the die 70 that forms a reservoir above the nip rolls 80. Creating a hydrostatic pressure that can reduce or eliminate edge wrinkles. The space below the air cooling ring 70 is sufficiently large to add secondary air cooling rings (not shown) to enable coextrusion at higher rates.

Figure 4:
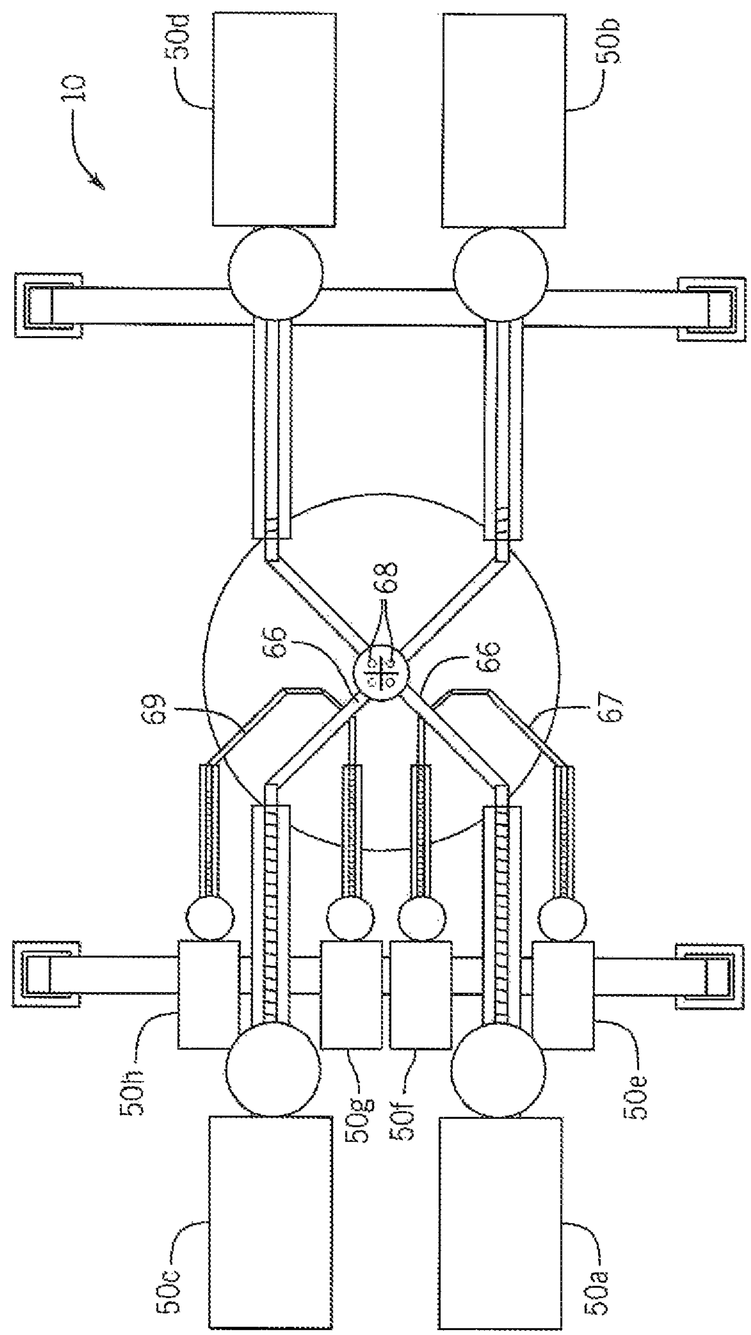
FIG. 4 schematically illustrates a top view of another embodiment of a blown film coextrusion line.

FIG. 4 is a schematic top view of an alternative blown film coextrusion line 10 that includes additional extruders. In addition to the four extruders 50*a*, 50*b*, 50*c* and 50*d*, two smaller satellite extruders 50*e* and 50*f* are mounted on both sides of the extruder 50*a* and two smaller satellite extruders 50*g* and 50*h* are mounted on both sides of the extruder 50*b*. The satellite extruders 50*e* and 50*f* feed individual polymer streams into two individual feed lines 67 that can ultimately approach the feed line 66 associated with extruder 50*a*. The polymer compositions from extruders 50*a*, 50*e* and 50*f* can thus be fed into three separate inlets 68 of coextrusion dies 70 to make three individual film layers. The satellite extruders 50*g* and 50*h* feed individual polymer streams into two individual feed lines 69 that can ultimately approach the feed line 66 associated with extruder 50*b*. The polymer compositions from extruders 50*b*, 50*g* and 50*h* can thus be fed into three separate inlets 68 of coextrusion dies 70 to make three individual film layers. In one embodiment, two smaller satellite extruders can be placed adjacent to all four extruders 50*a*, 50*b*, 50*c* and 50*d* to enable the feeding of twelve different polymer streams into the blown film coextrusion die 70, thus enabling the production of a wide variety of nanolayer film structures ranging from complex to simple as described in U.S. Publication 2020/0391425 and U.S. Publication 2020/0391427, for example.

In one embodiment, the first, second, third and fourth extruders 50*a*, 50*b*, 50*c* and 50*d* each can have an extruder screw diameter of about 20 mm to about 100 mm, or about 25 mm to about 75 mm, or about 40 mm to about 60 mm, or about 50 mm. These four extruders may each have the same screw diameter or may have different screw diameters. When fifth, sixth, seventh and eighth extruders 50*e*, 50*f*, 50*g* and 50*h* are utilized, they may have the same or different diameters than the extruders 50*a*, 50*b*, 50*c* and 50*d*. In one embodiment, in order to optimize the use of space, the fifth, sixth, seventh and eighth extruders can have smaller diameters that the first, second, third and fourth extruders. For example, the first, second, third and fourth extruders 50*a*, 50*b*, 50*c* and 50*d* may each have an extrusion screw diameter of about 50 mm. The fifth, sixth, seventh and eighth extruders 50*e*, 50*f*, 50*g* and 50*h* may each have a smaller extrusion screw diameter of about 25 mm.

Figure 5:
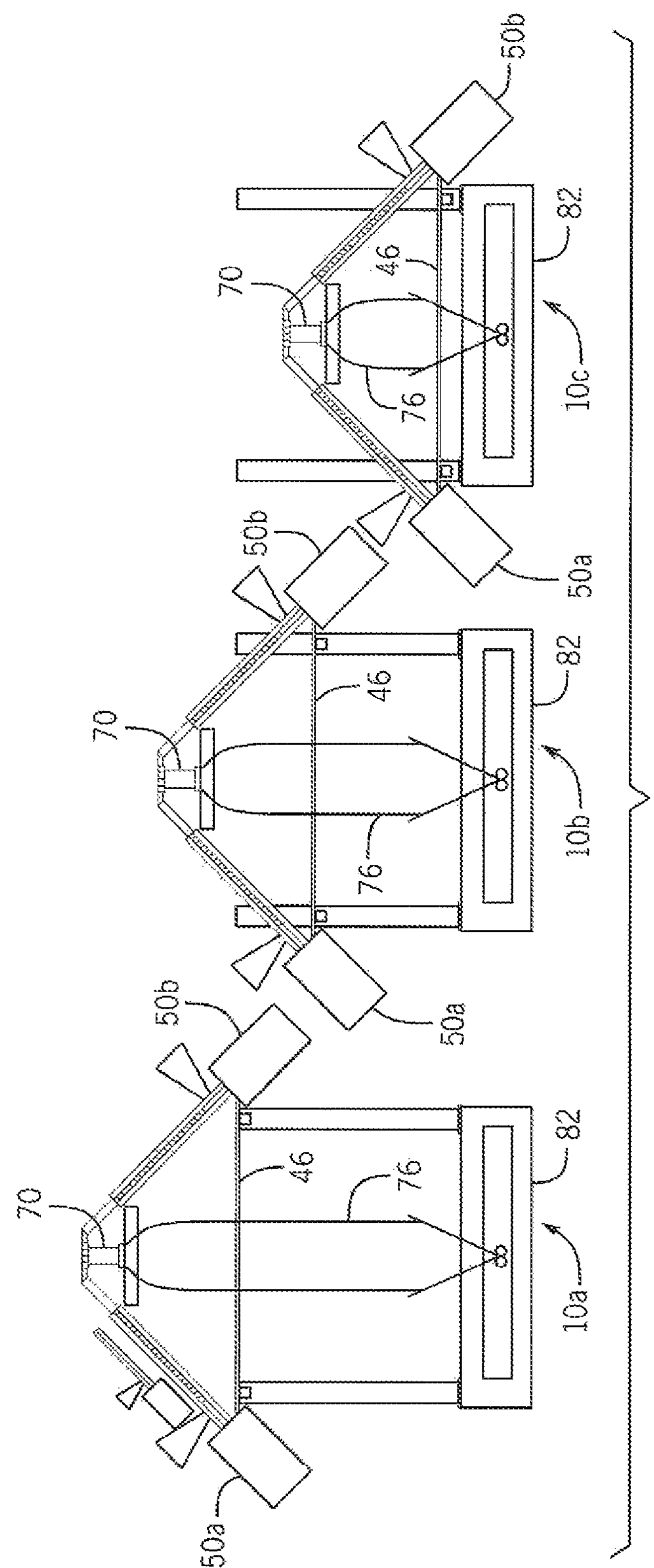
FIG. 5 schematically illustrates a front view of the blown film coextrusion line of FIG. 4, shown in three different vertical positions.

Additional extruders can also be included in the blown film coextrusion line 10 as needed for a particular application. By tilting the extruders upward at shown in FIG. 1, for example, removal and cleaning of the extrusion screws from the extruders becomes easier due to the assistance from gravity. It also becomes easier to perform maintenance at close to ground level, and to fill the extruder hoppers 58 with polymer pellets or powder. The tilting also virtually guarantees that the extruders will be fully loaded while feeding molten polymer to the blown film coextrusion die 70, helping to assure consistent and reliable polymer feed rates. Moreover, a mezzanine is no longer needed because all die and air ring adjustment can be performed at close to ground level by lowering the blown film coextrusion die to its lowest position as shown in FIG. 5 and described further below. Moreover, the upward tilt enables the use of a torque direct drive motor in each extruder, which is easier to remove and replace when the extrusion screws are removed for cleaning.

FIG. 5 schematically illustrates how the adjustable platform 46 described above can be used to raise and lower the extruders 50*a*, 50*b*, 50*c*, 50*d*, etc. (collectively "50"), and the blown film coextrusion die 70 to three different vertical positions in the blown film coextrusion line 10. In the most extended position 10*a*, the extruders 50 and die 70 are located furthest from the base 82, resulting in a relatively long blown film bubble 76 that may be suitable for higher production rates and/or polymer compositions that are more difficult to quench, thus warranting longer cooling distances. In the intermediate position 10*b*, the extruders 50 and die 70 are located midway above the base 82, resulting in a blown film bubble of intermediate length that may be suitable for intermediate production rates and/or polymer compositions that are relatively easier to quench when present in film layers. In the lowest position 10*c*, the extruders 50 and die 70 are located relatively close to the base 82, resulting in a short blown film bubble that may be suitable for lower production rates and/or polymer compositions that quench very quickly when present in film layers. The position 10*c* is also useful for cleaning, maintaining, adjusting, and repairing the blown film coextrusion line 10 because the primary operating components are at or near the standing level of an operator.

The extruders 50 should have a suitable length and size to a) achieve the desired blown film production rates and b) extend an appropriate distance from the platform 46 to the coextrusion die 70 to provide the desired support for the die 70 and enable the formation of a triangular or other desired polygonal or polyhedral arrangement so as to alleviate the need for a tower or similar structure. In one embodiment, the primary extruders 50*a*, 50*b*, 50*c* and 50*d* can be 2-inch extruders made and sold by Davis-Standard, LLC and the satellite extruders can be somewhat smaller as needed to meet space limitations. The blown film coextrusion die 70 can be of suitable size to produce a 40-inch wide film at a production rate of 300 lbs./hr. Other sizes and dimensions of the extruders, coextrusion die and related components can also be selected as needed to provide coextruded blown films having a wide variety of sizes at a variety of production rates.

Figure 6:
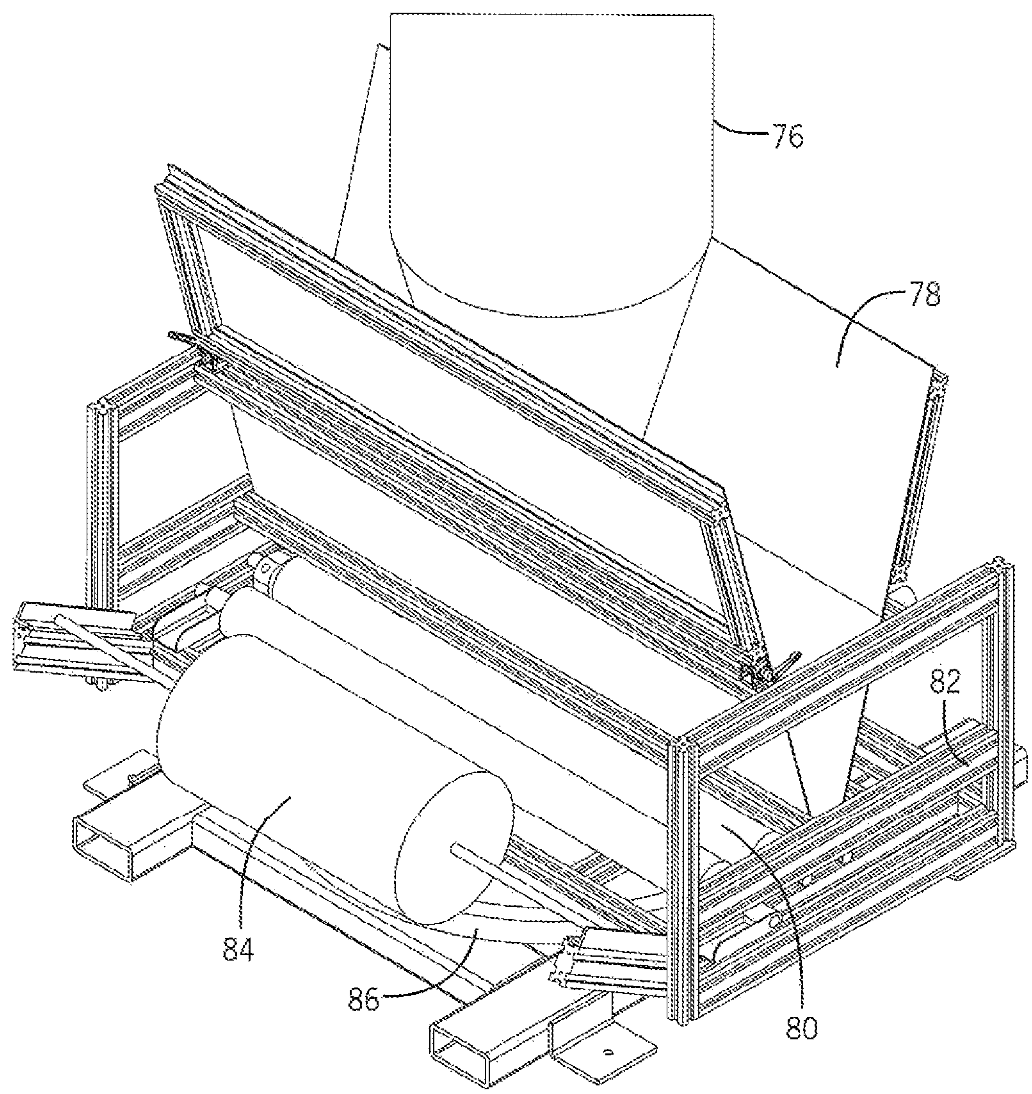
FIGS. 6 and 7 show top and bottom perspective views of a 360-degree rotating converging frame winder that can be included in the blown film coextrusion line to collapse and wind a downward facing multilayer coextruded blown film bubble, to make the multilayer coextruded blown film.
Figure 7:
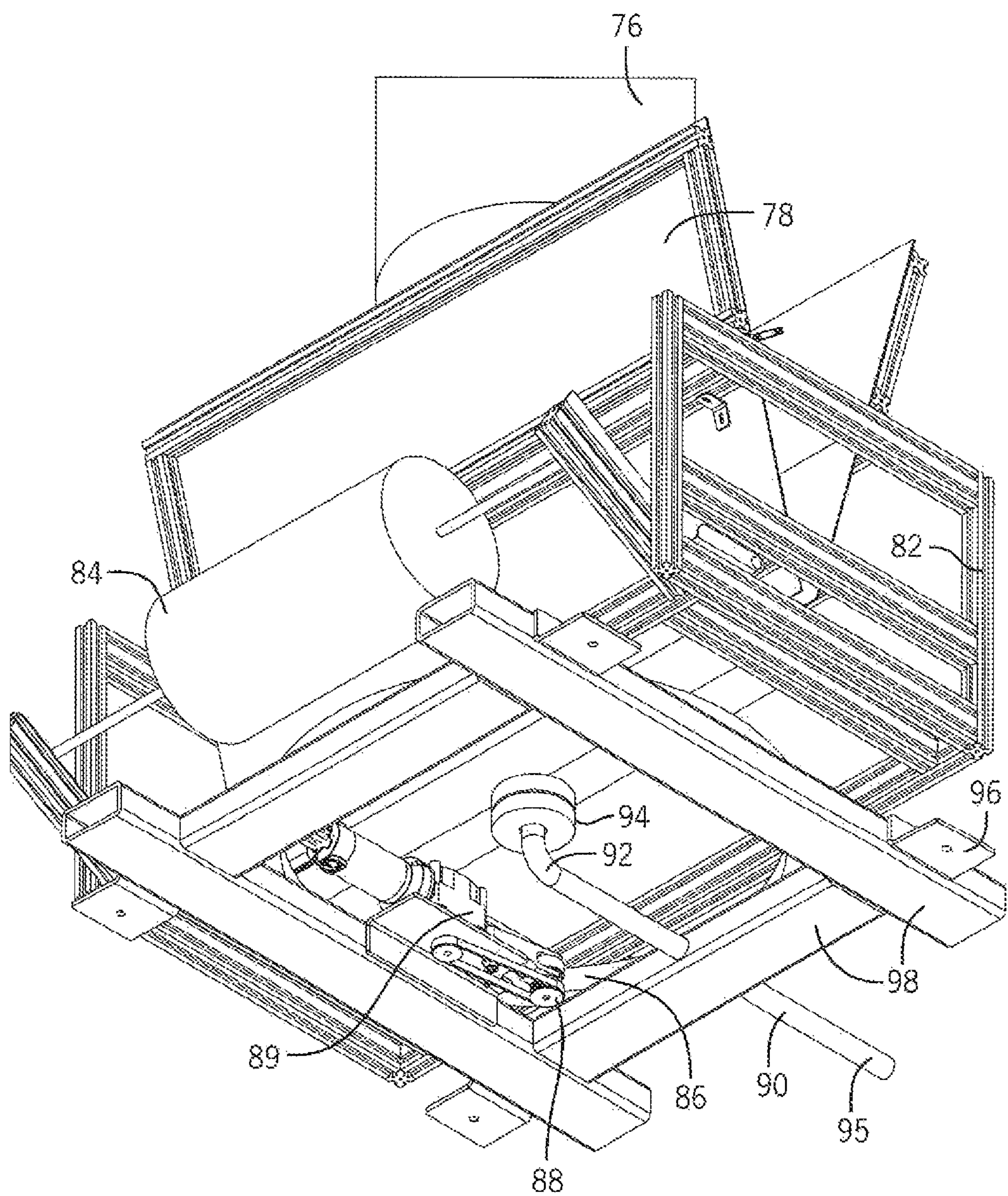

Referring to FIGS. 6 and 7, the collapsing frame 78 and nip rollers 80 may form part of a rotating converging frame winder 100 that, in one embodiment, can exhibit continuous 360-degree rotation while collapsing the downward facing coextruded blown film bubble 76 for winding around a roller 84. The winder 100 includes the collapsing frame 78, the nip rollers 80, the frame 82 and the winding roller 84 mounted to a rotating turntable that includes a circular mount 86, a gear assembly 88 driven by a motor 89, and an axle assembly 90 including an axle 92, rotational slide bearings 94 and a mounting shaft 95. As the motor 89 turns the gear assembly 88, the gear assembly 88 engages an inner surface of the circular mount 86 as shown in FIG. 7. The resulting rotation of the circular mount 86 around the axle shaft 92, aided by rotational slide bearings 94, causes a continuous 360-degree rotation of the circular mount 86 and the associated collapsing frame 78, nip rollers 80, frame 82 and winding roller 84 as the coextruded blown film bubble 76 is being generated. The continuous rotation helps to eliminate nonuniformities such as edge lines, die lines and thickness variations in the collapsed blown film, resulting in a more uniform higher quality coextruded multilayer blown film. The entire converging frame winder 100 and all of its components can be mounted to and supported by a stationary support frame 96 that includes a plurality of interconnected and/or interlocking support beams 98 as shown in FIG. 7. In the embodiment shown, the mounting shaft 95 of the axle assembly 90 penetrates and is supported by one of the support beams 98, while the motor 89 and gear assembly 88 are mounted to and supported by another of the support beams 98.

In one embodiment, the motor 89 can be a Dayton ½ hp variable speed drive motor. The motor 89 can be affixed to the rotating circular mount 86, also called a turntable, using a driven rubber wheel (gear assembly 88) to facilitate the 360-degree rotation. The 360-degree rotation enables production of finished blown film rolls having a flat profile because any thickness variations are evenly scattered across the width of the collapsed, flattened coextruded blown film.

The corresponding method of making a multilayer coextruded blown film can be used to make a wide variety of coextruded blown films and is particularly suited for making simple or complex nanolayer blown films as described in U.S. Patent Application Publication 2020/0391427, the disclosure of which is incorporated herein by reference. In this embodiment, the coextrusion die 70 can be a modular disk coextrusion die having an opposing disk arrangement as described in the foregoing publication. A multilayer nanolayer blown film is understood to mean films that are composed primarily of nanolayers having thicknesses of less than about 0.001 mm (less than about 1000 nm), or about 1 to about 999 nm. The nanolayer film may include at least about 80% nanolayers based on the total number of film layers, or at least about 90% nanolayers, or at least about 95% nanolayers, or at least about 99% nanolayers, or about 100% nanolayers. For example, the multilayer nanolayer film may have at least about 25 nanolayers, or at least about 50 nanolayers, or at least about 75 nanolayers, or at least about 100 nanolayers, or at least about 150 nanolayers, or at least about 200 nanolayers, or at least about 250 nanolayers, or at least about 300 nanolayers. In other examples, the multilayer nanolayer film can include up to about 1000 nanolayers, or up to about 800 nanolayers, or up to about 600 nanolayers, or up to about 500 nanolayers, or up to about 400 nanolayers, or up to about 300 nanolayers. The multilayer nanolayer blown film can utilize up at about 12, or up to about 16, or up to about 20, or up to about 24 polymer melt streams provided using an appropriate number of extruders. The melt streams can have the same, different, and/or a combination of the same and different polymer compositions.

The blown film coextrusion line 10 enables the production of a wide variety of complex multilayer coextruded annular films, each including many continuous unbroken and non-overlapping annular nanolayers arranged in sequence. The phrase "continuous, unbroken and non-overlapping" means that each of the nanolayers and the overall film is a) continuous in the annular direction, b) devoid of breaks and discontinuities in the annular direction, and c) devoid of overlapping folds, i.e., no annular portion of any nanolayer or the overall film is folded over onto itself in a manner that would multiply the film thickness at that location.

The blown film coextrusion line 10 can be used to produce nanolayer films having large numbers of nanolayers and exhibiting high levels of transparency and/or thermoformability. Barrier films containing various layer combinations of polyethylene terephthalate glycol (PETG) ethylene acrylic acid (EAA), low-density or linear low density polyethylene (LDPE or LLDPE) and ethylene-vinyl alcohol (EVOH) have been found to exhibit excellent transparency and thermoformability. Similar film combinations made using nylon-6 instead of or in addition to EVOH exhibit high transparency as well as thermoformability at tailored layer thicknesses. Other polyester homopolymers and copolymers cam also be used in place of or in addition to the PETG. Exemplary polyester homopolymers include without limitation polyethylene terephthalate, polybutylene terephthalate, and combinations thereof. Polyester homopolymers provide excellent transparency but are generally not heat sealable. In order to provide the nanolayer film with heat sealability, one or both of the outer layers can be formed using a polyester copolymer. Suitable polyester copolymers include without limitation polyethylene terephthalate glycol, polyethylene terephthalate-1,4-cyclohexane-2 methyl ester, polyester-polyether block copolymers, and combinations thereof. Polyethylene terephthalate glycol (PETG) is particularly suitable for one or both outer film layers because it provides excellent heat sealability and transparency. For optimal transparency, the polyester copolymer can have a degree of crystallinity of less than about 20%, suitably less than about 15%, measured using ASTM D1505.

The nanolayers of the films, including those described below, can be as thin as possible in order to provide the multilayer coextruded nanolayer films 10 with maximum transparency. The term "nanolayers" refers to film layers having thicknesses in the submicron range, typically between about 1 to about 999 nanometers, or about 10 to about 500 nanometers, or about 20 to about 100 nanometers. Film clarity is a measure of percent light transmittance and can be measured using ASTM D1746. For example, when a film is exposed to 100% of an incident light source, the transmittance is 100% minus (percent absorption+percent reflection). For optimal performance and appearance, the multilayer coextruded nanolayer film produced using the modular disk coextrusion die 10 can have a light transmittance of at least about 80%, suitably at least about 84%, or at least about 88%.

The multilayer coextruded nanolayer film can also include adhesive tie nanolayers that bond the remaining nanolayers together and exhibit adhesive bonding both to moisture barrier nanolayers (for example, LDPE or LLDPE) and oxygen barrier nanolayers (for example, EVOH or polyamide) in order to bond them together. The adhesive tie layers can be formed of a soft polymer that exhibits tackiness without compromising film clarity. Suitable soft polymers include without limitation ethylene methyl acrylate (EMA), ethylene ethyl acrylate (EEA), ethylene acrylic acid (EAA), ethylene methacrylic acid (EMMA), and combinations thereof. EEA and EAA are particularly suitable as nanolayer tie layers that provide excellent adhesion and transparency because of their low crystallinity and high clarity. The foregoing adhesives can also be blended with other adhesive materials, such as chemically-modified polyolefins, provided that the desired clarity can be maintained. Suitable chemically-modified polyolefins include without limitation anhydride-modified polyethylenes, including low density or linear low density polyethylene grafted with maleic anhydride. The chemically-modified polyolefin can improve the adhesion between the polar oxygen barrier layers (for example, EVOH or polyamide) and the moisture barrier layers (for example, LDPE or LLDPE) and can also bond well to the PETG or other polyester copolymer used for outer heat seal layers. The adhesive tie layers can suitably be nanolayers having only the thickness needed to ensure adequate bonding between adjacent layers.

When used as moisture barrier layers, the LDPE or LLDPE nanolayers can be selected to have relatively low crystallinity in order to maintain optimal transparency. Nanolayers formed using low density polyethylene or linear low density polyethylene can be selected to have a crystallinity at the lower end of the conventional range for optimal clarity. Low density and linear low density polyethylene typically have crystallinities ranging from about 35% to about 60%. When used as nanolayers in a transparent and/or thermoformable film structure, the low density or linear low density polyethylene can be selected to have a crystallinity at the lower end of the normal range, suitably about 35% to about 45%, or about 35% to about 40%, and can have a density of about 0.910 to about 0.925 grams/$cm^3$.

The blown film coextrusion line 10 and the corresponding method of the invention can be used to produce a wide variety of simple and complex blown (annular) film structures, including without limitation the multilayer nanolayer films described above and below. For example, the blown film line 10 and corresponding method can be used to produce complex blown (annular) films in which any sequence of nanolayers formed using up to twelve, sixteen, twenty or twenty-four polymer melt streams can be optimized to provide optimal combinations of oxygen barrier, moisture barrier, strength and/or other desired properties. Large sequences of layers called "repeating units" can be included in the nanolayer films and can be repeated many times. In one embodiment, the multilayer coextruded annular film including the plurality of continuous unbroken and overlapping nanolayers can include a number "x" of repeating units that define a repeating sequence of nanolayers. Each repeating unit includes a number "y" of nanolayers and includes at least three layers having polymer compositions that differ from each other. The number "x" is an integer of at least 2, or at least 3, or at least 4, or at least 5, or at least 6, or at least 7, or at least 8, or at least 9, or at least 10, or at least 11, or at least 12. The number "y" is an integer of at least 3, or at least 4, or at least 5, or at least 6, or at least 7, or at least 8, or at least 9, or at least 10, or at least 11, or at least 12. The product of x multiplied by y is at least 24, or at least 36, or at least 48, or at least 60, or at least 72, or at least 84, or at least 96, or at least 108, or at least 120, or at least 132, or at least 144, or at least 156, or at least 168, or at least 180, or at least 192, or at least 204. Depending in part on the number "y" of nanolayers in each repeating unit, at least three, or at least four, or at least five, or at least six, or at least seven, or at least eight, or at least nine, or at least ten, or at least eleven, or at least twelve of the nanolayers in the repeating unit have polymer compositions that differ from each other.

Various combinations of "x," "y" and the product of "x" and "y" are contemplated. In one embodiment, "x" is at least 2 and "y" is at least 12. In another embodiment, "x" is at least 3 and "y" is at least 8. In another embodiment, "x" is at least 4 and "y" is at least 6. In another embodiment, "x" is at least 6 and "y" is at least 4. In another embodiment, "x" is at least 8 and "y" is at least 3. In another embodiment, "x" is at least 8 and "y" is at least 4. In another embodiment, "x" is at least 24 and "y" is at least 4. In another embodiment, "x" is at least 24 and "y" is at least 3. In another embodiment, "x" is at least 64 and "y" is at least 3. In another embodiment, "x" is at least 48 and "y" is at least 4. The foregoing embodiments are exemplary and non-limiting. And combination of "x," "y" and the product of "x" and "y" is contemplated, so long as "x" is at least 2, "y" is at least 3, and the product of "x" and "y" is at least 24.

The nanolayer film structures that can be produced using the blown film coextrusion line 10 can include a wide variety of polymer combinations designed to optimize properties such as oxygen barrier, moisture barrier, adhesion between layers, film strength and optics. Examples of oxygen barrier polymers include without limitation polyamides, ethylene vinyl alcohols, polyketones, polyvinyl chlorides, copolymers of vinyl chloride and methyl acrylate, copolymers of vinyl chloride and ethyl acrylate, and combinations thereof. Polyamides include without limitation Nylon 6, Nylon 4-6, Nylon 6-6, Nylon 6-9, Nylon 6-10, Nylon 6-12, Nylon 11, and Nylon 12. Ethylene vinyl alcohol includes copolymers of ethylene and vinyl alcohol having ethylene contents ranging from about 25% to about 50% by mol, including without limitation those having molar ethylene contents of 27%, 29%, 32%, 38%, 44% and 48%. Polyketones are copolymers and terpolymers of olefins and carbon monoxide, including without limitation ethylene-carbon monoxide, propylene-carbon monoxide, ethylene-propylene-carbon monoxide, and the like. Polyketones and polyvinyl chlorides provide both oxygen barrier and moisture barrier, unlike many gas barrier polymers that provide oxygen barrier but little or no moisture barrier.

Moisture barrier polymers include without limitation polyolefins such as polyethylene, polypropylene, polybutene, ethylene-alpha olefin copolymers; polyvinyl chlorides (especially polyvinyl dichloride); and polyketones. Polyethylenes include high density polyethylene and branched low density polyethylene. Ethylene-alpha olefin copolymers are copolymers of ethylene and one or more comonomers selected from $C_3$ to $C_{10}$ alpha-olefins. Examples include linear medium density polyethylene, linear low density polyethylene, very low density polyethylene and ultra-low density polyethylene. The most common comonomers are propylene, butene, hexene and octene. The density generally decreases as the amount of comonomer is increased.

Adhesive tie resins are typically needed to bond oxygen barrier and moisture barrier layers together, and/or to bond both oxygen barrier and moisture barrier layers to the high strength polymer layers described below. Adhesive tie resins include without limitation ethylene vinyl acetate, ethylene methyl acrylate, ethylene ethyl acrylate, ethylene methyl methacrylate, ethylene acrylic acid, ethylene methacrylic acid, anhydride-modified polyolefins such as polyethylene, polypropylene and polybutene, anhydride-modified ethylene-alpha olefin copolymers, and ionomers. Elastomers such as styrene-butadiene, styrene-butadiene-styrene, styrene-ethylene-butadiene-styrene, and polycaprolactones can also be used alone or in combination with other adhesive tie polymers to provide enhanced adhesion between adjacent layers.

High strength polymers can be employed to provide enhanced film strength, abuse resistance and, in some cases, improved optical properties. High strength polymers include without limitation polyesters such as polyethylene terephthalate, polybutylene terephthalate, polyethylene terephthalate-1,4-cyclohexane-2-methyl ester, polycarbonate, polycyclohexylene-dimethylene terephthalate, polyphthlate carbonate, polytrimethylene terephthalate; polycarbonates; polystyrenes; polyvinyl chlorides; polyacrylonitrile; and styrene acrylonitrile.

The blown film coextrusion line 10 can produce multilayer coextruded annular films, such as nanolayer films, having continuous unbroken and non-overlapping nanolayers in the circumferential (annular) direction. Examples of multilayer coextruded annular films that possess the continuous unbroken and non-overlapping nanolayers include films having any of the foregoing combinations of "x" and "y" in the repeating units, and including, but not limited to, the following examples:

1. A multilayer coextruded annular film including a plurality of continuous unbroken and non-overlapping annular nanolayers arranged in sequence;
   - the plurality of nanolayers including a number "x" of repeating units defining a repeating sequence of nanolayers;
   - each repeating unit including a number "y" of nanolayers, including at least three nanolayers having polymer compositions that differ from polymer compositions of each other;
   - wherein "x" is an integer of at least 2, "y" is an integer of at least 3, and "x" multiplied by "y" is at least 24.

2. The multilayer coextruded annular film (1), wherein "x" is at least 2 and "y" is at least 12.

3. The multilayer coextruded annular film (1), wherein "x" is at least 3 and "y" is at least 8.

4. The multilayer coextruded annular film (1), wherein "x" is at least 4 and "y" is at least 6.

5. The multilayer coextruded annular film (1), wherein "x" is at least 6 and "y" is at least 4.

6. The multilayer coextruded annular film (1), wherein "x" is at least 8 and "y" is at least 3.

7. Any of the preceding multilayer coextruded annular films (1) to (6), wherein at least one nanolayer in the repeating unit includes a polyamide, at least one nanolayer in the repeating unit includes an ethylene vinyl alcohol, and at least one nanolayer in the repeating unit includes an adhesive tie resin.

8. Any of the preceding multilayer coextruded annular films (1) to (6), wherein at least one nanolayer in the repeating unit includes a polyolefin, at least one nanolayer in the repeating unit includes a polyamide, and at least one nanolayer in the repeating unit includes an adhesive tie resin.

9. Any of the preceding multilayer coextruded annular films (1) to (6), wherein at least one nanolayer in the repeating unit includes a polyolefin, at least one nanolayer in the repeating unit includes an ethylene vinyl alcohol, and at least one nanolayer in the repeating unit includes an adhesive tie resin.

10. Any of the preceding multilayer coextruded annular films (1) to (6), wherein at least one nanolayer in the repeating unit includes a polyester, at least one nanolayer in the repeating unit includes a polyolefin, and at least one nanolayer in the repeating unit includes an adhesive tie resin.

11. The multilayer coextruded annular film (10), wherein the polyester includes polyethylene terephthalate (PET) or polyethylene terephthalate glycol (PETG), the polyolefin includes low density polyethylene (LDPE) or linear low density polyethylene (LLDPE), the adhesive tie resin comprises ethylene methyl acrylate (EMA), ethylene ethyl acrylate (EEA) or ethylene acrylic acid (EAA), and the repeating unit includes a sequence of nanolayers that include the following polymers in either order: polyester/adhesive/polyolefin.

12. The multilayer coextruded annular film (10), wherein the polyester includes polyethylene terephthalate-1,4-cyclohexane-2-methyl ester, the polyolefin includes polyethylene, the adhesive tie resin includes ethylene methyl acrylate, and the repeating unit includes a sequence of nanolayers that include the following polymers in either order: polyethylene terephthalate-1,4-cyclohexane-2 methyl ester/ethylene methyl acrylate/polyethylene.

13. Any of the preceding multilayer coextruded annular films (1) to (6), wherein at least one nanolayer in the repeating unit includes a polycarbonate, at least one nanolayer in the repeating unit includes a polyolefin, and at least one nanolayer in the repeating unit includes an adhesive tie resin.

14. The multilayer coextruded annular film (13), wherein the polyolefin includes polyethylene, the adhesive tie resin includes ethylene methyl acrylate, and the repeating unit comprises a sequence of nanolayers that include the following polymers in either order: polycarbonate/ethylene methyl acrylate/polyethylene.

15. Any of the preceding multilayer coextruded annular films (1) to (6), wherein at least one nanolayer in the repeating unit includes ethylene vinyl alcohol, at least two nanolayers in the repeating unit include an adhesive tie resin, and at least one nanolayer in the repeating unit includes a polyamide.

16. Any of the preceding multilayer coextruded annular films (1) to (6), wherein at least one nanolayer in the repeating unit includes ethylene vinyl alcohol, at least two nanolayers in the repeating unit include a polyamide, at least one layer in the repeating unit includes a polyolefin, and at least one layer in the repeating unit includes an adhesive tie resin.

17. Any of the preceding multilayer coextruded annular films (1) to (6), wherein the repeating unit includes a sequence of nanolayers that include the following polymers in either order: polyethylene/polyethylene/tie resin/Nylon 6/tie resin/ethylene vinyl alcohol/tie resin/Nylon 6-10/tie resin/ethylene vinyl alcohol/tie resin/Nylon 6-10.

18. Any of the preceding multilayer coextruded annular films (1) to (6), wherein the repeating unit includes a sequence of nanolayers that include the following polymers in either order: ethylene vinyl alcohol/tie resin/polyethylene/tie resin/Nylon 6/tie resin/Nylon 6-10/tie resin.

19. Any of the preceding multilayer coextruded annular films (1) to (6), wherein the repeating unit includes a sequence of nanolayers that include the following polymers in either order: tie resin/ethylene vinyl alcohol/tie resin/high density polyethylene/tie resin/Nylon 6/tie resin/high density polyethylene.

20. Any of the preceding multilayer coextruded annular films (1) to (6), wherein at least one nanolayer in the repeating unit includes a polyvinyl chloride, at least one nanolayer in the repeating unit includes an ethylene vinyl alcohol, and at least one nanolayer in the repeating unit includes an adhesive tie resin.

21. Any of the preceding multilayer coextruded annular films (1) to (6), wherein at least one nanolayer in the repeating unit includes a polyvinyl chloride, at least one nanolayer in the repeating unit includes a polyamide, and at least one nanolayer in the repeating unit includes an adhesive tie resin.

22. Any of the preceding multilayer coextruded annular films (1) to (6), wherein at least one nanolayer in the repeating unit includes a polyolefin, at least one nanolayer in the repeating unit includes a polyvinyl chloride, and at least one nanolayer in the repeating unit includes an adhesive tie resin.

23. Any of the preceding multilayer coextruded annular films (1) to (6), wherein at least one nanolayer in the repeating unit includes a polyester, at least one nanolayer in the repeating unit includes a polyvinyl chloride, and at least one nanolayer in the repeating unit includes an adhesive tie resin.

24. Any of the preceding multilayer coextruded annular films (1) to (6), wherein at least one nanolayer in the repeating unit includes a polycarbonate, at least one nanolayer in the repeating unit includes a polyvinyl chloride, and at least one nanolayer in the repeating unit includes an adhesive tie resin.

25. Any of the preceding multilayer coextruded annular films (1) to (6), wherein at least one nanolayer in the repeating unit includes a polyketone, at least one nanolayer in the repeating unit includes an ethylene vinyl alcohol, and at least one nanolayer in the repeating unit includes an adhesive tie resin.

26. Any of the preceding multilayer coextruded annular films (1) to (6), wherein at least one nanolayer in the repeating unit includes a polyketone, at least one nanolayer in the repeating unit includes a polyamide, and at least one nanolayer in the repeating unit includes an adhesive tie resin.

27. Any of the preceding multilayer coextruded annular films (1) to (6), wherein at least one nanolayer in the repeating unit includes a polyester, at least one nanolayer in the repeating unit includes a polyketone, and at least one nanolayer in the repeating unit includes an adhesive tie resin.

28. Any of the preceding multilayer coextruded annular films (1) to (6), wherein at least one nanolayer in the repeating unit includes a polyolefin, at least one nanolayer in the repeating unit includes a polyketone, and at least one nanolayer in the repeating unit includes an adhesive tie resin.

29. Any of the preceding multilayer coextruded annular films (1) to (6), wherein at least one nanolayer in the repeating unit includes polyethylene terephthalate, at least one nanolayer in the repeating unit includes a polyketone, and at least one nanolayer in the repeating unit includes an adhesive tie resin.

30. Any of the preceding multilayer coextruded annular films (1) to (6), wherein at least one nanolayer in the repeating unit includes a copolymer of vinyl chloride and methyl acrylate or ethyl acrylate, at least one nanolayer in the repeating unit includes an ethylene vinyl alcohol, and at least one nanolayer in the repeating unit includes an adhesive tie resin.

31. Any of the preceding multilayer coextruded annular films (1) to (6), wherein at least one nanolayer in the repeating unit includes a copolymer of vinyl chloride and methyl acrylate or ethyl acrylate, at least one nanolayer in the repeating unit includes a polyamide, and at least one nanolayer in the repeating unit includes an adhesive tie resin.

32. Any of the preceding multilayer coextruded annular films (1) to (6), wherein at least one nanolayer in the repeating unit includes a polyester, at least one nanolayer in the repeating unit includes a copolymer of vinyl chloride and methyl acrylate or ethyl acrylate, and at least one nanolayer in the repeating unit includes an adhesive tie resin.

33. Any of the preceding multilayer coextruded annular films (1) to (6), wherein at least one nanolayer in the repeating unit includes a polyolefin, at least one nanolayer in the repeating unit includes a copolymer of vinyl chloride and methyl acrylate or ethyl acrylate, and at least one nanolayer in the repeating unit includes an adhesive tie resin.

34. Any of the preceding multilayer coextruded annular films (1) to (6), wherein at least one nanolayer in the repeating unit includes a polycarbonate, at least one nanolayer in the repeating unit includes a copolymer of vinyl chloride and methyl acrylate or ethyl acrylate, and at least one nanolayer in the repeating unit includes an adhesive tie resin.

35. Any of the preceding multilayer coextruded annular films (7) to (34), wherein "x" is at least 8, "y" is at least 4, and "x: multiplied by "y" is at least 96.

36. Any of the preceding multilayer coextruded annular films (7) to (34), wherein "x" is at least 24, "y" is at least 3, and "x: multiplied by "y" is at least 96.

37. A multilayer coextruded annular film including a plurality of continuous unbroken and non-overlapping annular nanolayers arranged in sequence;

- the plurality of nanolayers including a number "x" of repeating units defining a repeating sequence of nanolayers;
- each repeating unit including a number "y" of nanolayers, including at least three nanolayers having polymer compositions that differ from polymer compositions of each other;
- wherein "x" is an integer of at least 8, "y" is an integer of at least 4, and "x" multiplied by "y" is at least 96.

38. The multilayer coextruded annular film (37), wherein at least four of the nanolayers in the repeating unit have polymer compositions that differ from each other.

39. The multilayer coextruded annular film of (37) or (38), wherein "x" is an integer of at least 24.

40. A multilayer coextruded annular film including a plurality of continuous unbroken and non-overlapping annular nanolayers arranged in sequence;

- the plurality of nanolayer including a number "x" of repeating units defining a repeating sequence of nanolayers;
- each repeating unit including a number "y" of nanolayers, including at least three nanolayers having polymer compositions that differ from polymer compositions of each other;
- wherein "x" is an integer of at least 24, "y" is an integer of at least 3, and "x" multiplied by "y" is at least 192.

41. The multilayer coextruded annular film of (40), wherein "x" is an integer of at least 64 and "y" is an integer of at least 3.

42. The multilayer coextruded annular film (40) or (41), wherein "x" is an integer of at least 48 and "y" is an integer of at least 4.

43. Any of the preceding multilayer coextruded annular films (1) to (42) where the film has light transmittance of at least about 80%.

44. Any of the preceding multilayer coextruded annular films (1) to (42) where the film has light transmittance of at least about 84%.

45. Any of the preceding multilayer coextruded annular films (1) to (42) where the film has light transmittance of at least about 88%.

46. Any of the preceding multilayer coextruded annular films (1) to (45) where the film is thermoformable.

Embodiments of the method of making a multilayer coextruded blown film using the blown film coextrusion line can include the following steps. In one embodiment, the method can include the steps of:

- extruding a first polymer stream upward at a first angle toward a blown film coextrusion die using a first extruder;
- extruding a second polymer stream upward at a second angle toward the blown film coextrusion die using a second extruder; and
- extruding a third polymer stream upward at a third angle toward the blown film coextrusion die using a third extruder;
- feeding the first, second and third polymer streams into the blown film coextrusion die; and
- coextruding the first, second and third polymer streams using the blown film coextrusion die as a downward facing bubble to make the multilayer coextruded blown film.

In another embodiment, the method can include the following further steps:

- extruding a fourth polymer stream upward at a fourth angle toward the blown film coextrusion die using a third extruder;
- feeding the first, second, third and fourth polymer streams into the blown film coextrusion die; and
- coextruding the first, second, third and fourth polymer streams using the blown film coextrusion die as a downward facing bubble to make the coextruded blown film.

In still another embodiment, the method can include the following further steps:

- extruding a fifth polymer stream upward at a fifth angle toward the blown film coextrusion die using a fifth extruder;
- feeding the first, second, third, fourth and fifth polymer streams into the blown film coextrusion die; and
- coextruding the first, second, third, fourth and fifth polymer streams using the blown film coextrusion die as a downward facing bubble to make the coextruded blown film.

In still another embodiment, the method can include the following further steps:

- extruding a sixth polymer stream upward at a fifth angle toward the blown film coextrusion die using a fifth extruder;
- feeding the first, second, third, fourth, fifth and sixth polymer streams into the blown film coextrusion die; and
- coextruding the first, second, third, fourth, fifth and sixth polymer streams using the blown film coextrusion die as a downward facing bubble to make the coextruded blown film.

The foregoing arrangement can be applied using any number of additional extruders and any number of additional polymer melt streams. In any of the foregoing embodiments, the first, second and third angles can be acute angles relative to horizontal, meaning they are greater than zero and less than 90 degrees from horizontal. For example, the first, second and third angles can each be about 20 to about 70 degrees from horizontal, or about 30 to about 60 degrees from horizontal, or about 35 to about 55 degrees from horizontal, or about 40 to about 50 degrees from horizontal, or about 45 degrees from horizontal. For purposes of this disclosure, and angle is an "acute angle" if an angle of greater than zero and less than 90 degrees can be measured any direction, so long as the forward ends of the extruders and corresponding directions of extrusion of the polymer melt streams point directly or indirectly toward each other instead of away from each other. For example, referring to FIG. 2, all four extruders 50*a*, 50*b*, 50*c* and 50*d* are deemed to point directly or indirectly toward another extruder and each extruder and direction of extrusion forms an acute angle of about 45 degrees from horizontal. Extruders 50*a* and 50*b* point toward each other. Extruders 50*c* and 50*d* point directly toward each other. Extruders 50*a* and 50*d* point indirectly toward each other. Extruders 50*b* and 50*c* point indirectly toward each other.

Similarly, when fourth, fifth, sixth and/or additional polymer melt streams and corresponding extruders are employed, each additional polymer melt stream and corresponding extruder should point directly or indirectly to at least one, preferably more than one other extruder and polymer melt stream and should form corresponding fourth, fifth, sixth and, if applicable, additional acute angles relative to horizontal. The fourth, fifth, sixth and, to the extent applicable additional angles can each be about 20 to about 70 degrees from horizontal, or about 30 to about 60 degrees from horizontal, or about 35 to about 55 degrees from horizontal, or about 40 to about 50 degrees from horizontal, or about 45 degrees from horizontal, for example.

In one embodiment, the first, second and third angles can be acute angles that are about equal to each other. Where applicable, the fourth, fifth, sixth and any additional angles can be about equal to each other and about equal to the first, second and third angles.

In any of the foregoing embodiments, the method can further include the step of a) raising the first, second and third extruders and, when present, fourth, fifth, sixth and additional extruders, and the blown film coextrusion die, suitably in tandem, to increase a length of the blown film coextrusion bubble 76. Alternatively, or in addition to step a), the method can further include the step b) of lowering the first, second and third extruders and, when present, fourth, fifth, sixth and additional extruders, and the blown film coextrusion die, suitably in tandem, to decrease a length of the blown film coextrusion bubble 76. Optimization of the blown film coextrusion bubble 76 may include increasing and decreasing the bubble length multiple times until optimum bubble properties are achieved.

One example of a stiffer coextruded film justifying a shorter bubble length and height is a coextruded barrier film made from PETG, modified polyethylene adhesive, EVOH and LLDPE, suitably in that order of layers. The PETG has a relatively high glass transition temperature of about 85° C. Therefore, it is desirable to keep the bubble above the glass transition temperature of the PETG through the collapsing stage, where the film is softer and can be collapsed without creating wrinkles. Yet the bubble must be cool enough so that the coextruded film does not stick to itself when passing through the nip rollers and winding. Optimization can therefore be accomplished by raising and lowering the bubble length and height until the best conditions are achieved. Polycarbonate is another very stiff material with a high glass transition temperature, warranting a hot bubble with a short bubble length to avoid wrinkles during collapsing and convergence.

One example of a softer coextruded film justifying a longer bubble length, height and colling time is a barrier film formed using LLDPE, modified polyethylene adhesive, and EVOH, suitably in that order of layers. This layer combination includes all crystalline materials with relatively low glass transition temperatures. The layer combination remains relatively soft as the bubble is cooled using the air ring, and a long bubble length and cooling time do not cause wrinkles during collapsing and convergence of the coextruded blown film bubble. The bubble length needed for most soft materials is the length needed to cool and quench the coextruded blown film.

In any of the foregoing embodiments, the method can further include the steps of collapsing the downward facing coextruded blown film bubble and winding the coextruded blown film bubble. For example, these steps can be performed using the rotating converging frame winder described above.

While the embodiments of the invention described herein are exemplary, various modifications and improvements can be made without departing from the spirit and scope of the invention. The scope of the invention is defined by the appended claims and all changes that fall within the meaning and range of equivalents are intended to be embraced therein.

We claim:

1. A method of making a multilayer coextruded blown film, comprising the steps of:

extruding a first polymer stream upward at a first angle from horizontal toward a downward facing blown film coextrusion die using a first extruder;

extruding a second polymer stream upward at a second angle from horizontal toward the downward facing blown film coextrusion die using a second extruder; and extruding a third polymer stream upward at a third angle from horizontal toward the downward facing blown film coextrusion die using a third extruder;

feeding the first, second and third polymer streams into the downward facing blown film coextrusion die; and coextruding the first, second and third polymer streams using the downward facing blown film coextrusion die, as a downward facing bubble to make the multilayer coextruded blown film;

wherein the downward facing blown film coextrusion die is connected to and supported by hanging connections extending from the extruders, the first, second and third extruders are tilted upward and inward toward the downward facing blown film coextrusion die, proximal ends of the extruders are below distal ends of the extruders, and the distal ends define exits of the extruders.

2. The method of claim 1, wherein the hanging connections are provided by feed lines extending from the extruders.

3. The method of claim 1, wherein the extruders are connected to and supported by engaging portions of a vertically movable platform.

4. The method of claim 1, further comprising the steps of:

extruding a fourth polymer stream upward at a fourth angle from horizontal toward the downward facing blown film coextrusion die using a fourth extruder;

feeding the first, second, third and fourth polymer streams into the downward facing blown film coextrusion die; and coextruding the first, second, third and fourth polymer streams using the downward facing blown film coextrusion die as the downward facing bubble to make the multilayer coextruded blown film.

5. The method of claim 4, further comprising the steps of:

extruding a fifth polymer stream upward at a fifth angle from horizontal toward the downward facing blown film coextrusion die using a fifth extruder;

feeding the first, second, third, fourth and fifth polymer streams into the downward facing blown film coextrusion die; and coextruding the first, second, third, fourth and fifth polymer streams using the downward facing blown film coextrusion die as the downward facing bubble to make the multilayer coextruded blown film.

6. The method of claim 5, further comprising the steps of:

extruding a sixth polymer stream upward at a sixth angle from horizontal toward the downward facing blown film coextrusion die using a sixth extruder;

feeding the first, second, third, fourth, fifth and sixth polymer streams into the downward facing blown film coextrusion die; and coextruding the first, second, third, fourth, fifth and sixth polymer streams using the downward facing blown film coextrusion die as the downward facing bubble to make the multilayer coextruded blown film.

7. The method of claim 1, wherein the first, second and third angles are each about 20 to about 70 degrees from horizontal.

8. The method of claim 1, wherein the first, second and third angles are each about 30 to about 60 degrees from horizontal.

9. The method of claim 1, wherein the first, second and third angles are each about 40 to about 50 degrees from horizontal.

10. The method of claim 1, further comprising the step of raising or lowering the first, second and third extruders and the downward facing blown film coextrusion die to adjust a length of the downward facing bubble.

11. The method of claim 1, further comprising the steps of collapsing the downward facing bubble and winding the multilayer coextruded blown film using a rotating converging frame winder.

12. A method of making a multilayer coextruded blown film, comprising the steps of:

extruding a first polymer stream upward at a first angle from horizontal toward a downward facing blown film coextrusion die using a first extruder;

extruding a second polymer stream upward at a second angle from horizontal toward the downward facing blown film coextrusion die using a second extruder; and extruding a third polymer stream upward at a third angle from horizontal toward the downward facing blown film coextrusion die using a third extruder;

extruding a fourth polymer stream upward at a fourth angle from horizontal toward the downward facing blown film coextrusion die using a fourth extruder;

feeding the first, second, third and fourth polymer streams into the downward facing blown film coextrusion die; and coextruding the first, second, third and fourth polymer streams using the downward facing blown film coextrusion die as a downward facing bubble to make the multilayer coextruded blown film;

wherein the downward facing blown film coextrusion die is connected to and supported by connections extending from the extruders and the first, second, third and fourth angles are each about 20 to about 70 degrees from horizontal, the first, second, third and fourth extruders are tilted upward and inward toward the downward facing blown film coextrusion die, proximal ends of the extruders are below distal ends of the extruders, and the distal ends define exits of the extruders.

13. The method of claim 12, wherein the connections comprise hanging connections provided by feed lines extending from the extruders.

14. The method of claim 12, wherein the extruders are connected to and supported by engaging portions of a vertically movable platform.

15. The method of claim 12, wherein the first, second, third and fourth angles are each about 30 to about 60 degrees from horizontal.

16. The method of claim 12, wherein the first, second, third and fourth extruders each have a screw diameter of about 25 to about 75 mm.

17. The method of claim 12, wherein the multilayer coextruded blown film is made at a production rate of about 100 to about 1000 lbs./hr.

18. The method of claim 12, further comprising the steps of collapsing the downward facing bubble and winding the multilayer coextruded blown film using a rotating converging frame winder.

19. The method of claim 12, wherein the multilayer coextruded blown film comprises a nanolayer blown film.

20. The method of claim 19, wherein the nanolayer blown film comprises about 25 to about 500 nanolayers.

21. A method of making a multilayer coextruded blown film, comprising the steps of:

extruding a first polymer stream upward at a first angle from horizontal toward a downward facing blown film coextrusion die using a first extruder that is connected to an inlet of the downward facing blown film coextrusion die using a first connection;

extruding a second polymer stream upward at a second angle from horizontal toward the downward facing blown film coextrusion die using a second extruder that is connected to an inlet of the downward facing blown film coextrusion die using a second connection; and extruding a third polymer stream upward at a third angle from horizontal toward the downward facing blown film coextrusion die using a third extruder that is connected to an inlet of the downward facing blown film coextrusion die using a third connection;

feeding the first, second and third polymer streams into the downward facing blown film coextrusion die; and coextruding the first, second and third polymer streams using the downward facing blown film coextrusion die as a downward facing bubble to make the multilayer coextruded blown film;

wherein the first, second and third connections surround and sandwich the downward facing blown film coextrusion die between the extruders and maintain the downward facing blown film coextrusion die in a stable position during operation and the first, second and third extruders are tilted upward and inward toward the downward facing blown film coextrusion die, proximal ends of the extruders are below distal ends of the extruders, and the distal ends define exits of the extruders.

* * * * *